United States Patent [19]

Malinge

[11] Patent Number: 5,852,141
[45] Date of Patent: Dec. 22, 1998

[54] PREPOLYMER FOR THE POLYMERIZATION OF OLEFINS COMBINING A NUMBER OF SOLID CATALYTIC COMPONENTS

[75] Inventor: Jean Malinge, Loubieng, France

[73] Assignee: Elf Atochem S.A., France

[21] Appl. No.: 710,438

[22] Filed: Sep. 17, 1996

[30] Foreign Application Priority Data

Sep. 19, 1995 [FR] France .................................. 95 10942

[51] Int. Cl.⁶ .................................................. C08F 4/651
[52] U.S. Cl. ........................ 526/119; 526/904; 526/113; 526/114; 526/901; 502/108; 502/113; 502/115
[58] Field of Search .................................. 502/108, 113, 502/115; 526/119, 113, 114, 904

[56] References Cited

U.S. PATENT DOCUMENTS

| | | | |
|---|---|---|---|
| 4,478,951 | 10/1984 | Huff | 502/108 |
| 4,543,400 | 9/1985 | Wristers | 526/119 |
| 4,558,023 | 12/1985 | Brun et al. | |
| 4,611,038 | 9/1986 | Brun et al. | |
| 4,721,763 | 1/1988 | Bailly et al. | 526/88 |
| 5,173,540 | 12/1992 | Saito et al. | |
| 5,494,871 | 2/1996 | Brun et al. | |

FOREIGN PATENT DOCUMENTS

| | | |
|---|---|---|
| 562928 | 9/1993 | European Pat. Off. . |
| 604401 | 6/1994 | European Pat. Off. . |
| 673950 | 9/1995 | European Pat. Off. . |
| 2541683 | 8/1984 | France . |

*Primary Examiner*—Mark Nagumo
*Attorney, Agent, or Firm*—Bell, Boyd, & Lloyd

[57] ABSTRACT

The present invention relates to a prepolymer for the polymerization of olefins, the said prepolymer achieving a combination of a number of solid catalytic components for the polymerization of olefins. The combination of catalytic components makes it possible to combine two properties within the same polymer, one of the properties being contributed by one of the catalytic components and the other property being contributed by the other catalytic component.

9 Claims, No Drawings

PREPOLYMER FOR THE POLYMERIZATION OF OLEFINS COMBINING A NUMBER OF SOLID CATALYTIC COMPONENTS

FIELD OF THE INVENTION

The present invention relates to a prepolymer for the polymerization of olefins, the said prepolymer achieving a combination of a number of solid catalytic components for the polymerization of olefins.

BACKGROUND OF THE INVENTION

The combination of catalytic components can be of advantage when it is desired to combine two properties within the same polymer, one of the properties being contributed by one of the catalytic components and the other property being contributed by the other catalytic component. By way of example, it would be legitimate to think of obtaining a polymer with a broader distribution of molecular masses by using, in the polymerization, a combination of a catalytic component which generates low polymeric molecular masses and of a catalytic component which generates high molecular masses.

The combination of a number of catalytic components for the polymerization of olefins has already been attempted. The document EP 0,439,964 A2 describes the preparation of solid catalytic components containing both a component based on Mg, Cl and Ti and a derivative of a transition metal, the said metal having a cycloalkadiene group as ligand. This type of component leads to polymers with broadened molecular mass distributions.

U.S. Pat. No. 5,032,562 describes the preparation of polyolefins with multimodal molecular mass distributions by virtue of the use of a catalytic composition comprising a magnesium derivative containing Mg—OR bonds, a zirconium derivative and $TiCl_4$.

Patent Application EP 447,070 A1 teaches that a catalytic component prepared by impregnation of $MgCl_2$ with two electron donors, then addition of a zirconium metallocene and then addition of $TiCl_4$ leads, on polymerization, to a polymer with the bimodal molecular mass distribution.

The combination of the catalytic components can only be produced according to the prior art if one of the catalytic components is solid and the other liquid or soluble in an organic solvent, so as to be able to impregnate the solid catalytic component with the liquid component or its organic solution.

The prior art does not offer a satisfactory solution when it is desired to combine solid catalytic components and to use them in a suspension or gas-phase polymerization process. In fact, the Applicants have found that if two solid catalytic components are simply brought into contact and that if suspension or gas-phase polymerization is carried out in the presence of the mixture of these solid catalytic components, a non-homogeneous polymer is obtained. In fact, this polymer is composed of a mixture of grains, one portion of which is entirely derived from one of these catalytic components, the other portion of these grains being entirely derived from the other catalytic component. This non-homogeneity of the grains can result in a non-homogeneity in their conversion product.

DESCRIPTION OF THE INVENTION

Applicants have now found a new way of combining solid catalytic components, so as to obtain, by suspension or gas-phase polymerization, a homogeneous polymer. This combination involves the synthesis of a prepolymer.

Solid catalytic component is understood to mean, generally and in particular in the present application, a solid ingredient of a catalytic system for the polymerization of olefins, the said ingredient containing a transition metal and the said transition metal being active for the polymerization of olefins. The transition metal is known as active for the polymerization of olefins when the catalytic component which contains it catalyses the polymerization of olefins, if appropriate also by virtue of the presence in the polymerization medium of other ingredients of the said catalytic system. By way of example, the titanium contained in a conventional solid catalytic component of Ziegler-Natta type containing titanium, chlorine and magnesium atoms is the transition metal and is active for the polymerization of olefins. In fact, this type of catalytic component catalyses the polymerization of olefins by virtue of the titanium and also by virtue of the presence in the polymerization medium of a cocatalyst, in general an organic aluminium derivative, which is another ingredient of the catalytic system of which the solid catalytic component containing the titanium forms part.

The term prepolymerization is used to denote polymerization leading to a prepolymer. Prepolymer is generally understood to mean the active hydrocarbon solid or polymer obtained by prepolymerization of at least one olefin in the presence of a catalytic component, this solid representing not more than ten percent of the mass of the polymer which it is finally desired to synthesize by polymerization of at least one olefin in the presence of the said prepolymer. Generally, the kinetics of prepolymerization are controlled by controlling the flow rate of the olefin(s) intended to be prepolymerized. Generally, the degree of progression of the prepolymerization is less than or equal to 10,000 grams of prepolymer per millimole of active transition metal contained in the catalytic component from which the prepolymer has resulted. This degree of progression is calculated by taking into account the total polymer mass contained in the prepolymer. Thus, if the catalytic component contains a polymer, the degree of progression is calculated by determining the sum of the polymer mass formed during the prepolymerization and the polymer mass contained in the starting catalytic component and by then dividing this sum by the number of moles of transition metal contained in the starting catalytic component. The use of the term prepolymer necessarily implies that the prepolymer under consideration is active for the polymerization of olefins, that is to say that it catalyses the polymerization of olefins, if appropriate in the presence of a suitable cocatalyst, which can be of the same nature as the cocatalyst used during the polymerization which has led to the prepolymer.

The prepolymer according to the invention, also known as prepolymer AB, is obtained by the process comprising the following stages:

a) synthesis of a prepolymer A by prepolymerization A in the presence of a solid catalytic component A, then b) addition of an organic aluminium derivative and then of a solid catalytic component B on the prepolymer A, in order to obtain an aggregate, then c) gas-phase prepolymerization AB in the presence of the aggregate obtained in b).

The prepolymer according to the invention thus combines the catalytic component A and the catalytic component B. The prepolymer according to the invention can be used in polymerization to produce a polymer.

The prepolymer according to the invention is more homogeneous than if a simple mixture of the catalytic components A and B had been used in prepolymerization.

The polymer obtained by suspension or gas-phase polymerization in the presence of the prepolymer AB is more homogeneous than the polymer obtained by polymerization in the presence of a prepolymer itself obtained from a simple mixture of the catalytic components A and B.

Moreover, the way of combining the catalytic components A and B makes it possible to influence the morphology of the prepolymer according to the invention by the choice of the morphology of the catalytic component A, without the morphology of the catalytic component B generally having a substantial influence on it.

Thus, by way of example, if it is desired to manufacture a prepolymer AB of substantially spherical shape, it is preferable to chose a catalytic component A of substantially spherical shape.

Likewise, the way of combining the catalytic components A and B makes it possible to influence the morphology of the polymer obtained by suspension or gas-phase polymerization in the presence of the prepolymer AB by the choice of the morphology of the catalytic component A, without the morphology of the catalytic component B generally having a substantial influence on it.

Thus, by way of example, if it is desired to manufacture a polymer of substantially spherical shape, it is preferable to choose a catalytic component A of substantially spherical shape, without the nature of the catalytic component B substantially influencing the morphology of the final polymer.

Moreover, the way of combining the catalytic components A and B makes it possible to control the distribution of the particle sizes of the prepolymer according to the invention by the choice of the distribution of the particle sizes of the catalytic component A, without the distribution of the particle sizes of the catalytic component B generally having a substantial influence on it.

Likewise, the way of combining the catalytic components A and B makes it possible to control the distribution of the particle sizes of the polymer obtained by suspension or gas-phase polymerization in the presence of the prepolymer AB by the choice of the distribution of the particle sizes of the catalytic component A, without the distribution of the particle sizes of the catalytic component B generally having a substantial influence on it.

Another advantage of the invention is that of being able to use a catalytic component B containing very fine particles, without this resulting in a prepolymer AB exhibiting fine particles. In fact, it is sufficient to choose a catalytic component A without fine particles for the prepolymer according to the invention to be free from fine particles, without worrying about the presence or the absence of fine particles in the catalytic component B. The polymer obtained by suspension or gas-phase polymerization in the presence of the prepolymer AB will also be free from fine particles.

The transition metals contained in the catalytic components A and B can be chosen from the elements of groups 3b, 4b, 5b, 6b, 7b or 8, the lanthanides or the actinides of the periodic classification of the elements, as defined in the Handbook of Chemistry and Physics, sixty-first edition, 1980–1981. These transition metals are preferably chosen from titanium, vanadium, hafnium, zirconium or chromium.

The catalytic components A and B must be solid. They can be of Ziegler-Natta type. Any commercially-available solid catalytic component of Ziegler-Natta type may be suitable. By way of example, a catalytic component of Ziegler-Natta type can be provided in the form of a complex containing at least Mg, Ti and Cl, the titanium being in the Ti(IV) and/or Ti(III) chlorinated form, and can optionally contain an electron donor or acceptor.

A catalytic component of Ziegler-Natta type is generally the result of the combination of at least one titanium compound, one magnesium compound, chlorine and optionally one aluminium compound and/or one electron donor or acceptor, and any other compound which can be used in this type of component.

The titanium compound is generally chosen from chlorinated titanium compounds of formula $Ti(OR)_xCl_{4-x}$ in which R represents an aliphatic or aromatic hydrocarbon radical containing from one to fourteen carbon atoms or represents $COR^1$ with $R^1$ representing an aliphatic or aromatic hydrocarbon radical containing from one to fourteen carbon atoms and x represents an integer ranging from 0 to 3.

The magnesium compound is generally chosen from compounds of formula $Mg(OR^2)_nCl_{2-n}$ in which $R^2$ represents hydrogen or a linear or cyclic hydrocarbon radical and n represents an integer ranging from 0 to 2.

The chlorine present in the component of Ziegler-Natta type can arise directly from the titanium halide and/or from the magnesium halide. It can also arise from an independent chlorinating agent such as hydrochloric acid or an organic halide such as butyl chloride.

The electron donor or acceptor is a liquid or solid organic compound known for taking part in the composition of these catalytic components. The electron donor can be a mono- or polyfunctional compound advantageously chosen from aliphatic or aromatic carboxylic acids and their alkyl esters, aliphatic or cyclic ethers, ketones, vinyl esters, acrylic derivatives, in particular alkyl acrylates or alkyl methacrylates, and silanes such as aromatic, alicyclic or aliphatic alkoxysilanes. Particularly suitable as electron donor are compounds such as methyl paratoluate, ethyl benzoate, ethyl acetate or butyl acetate, ethyl ether, ethyl para-anisate, dibutyl phthalate, dioctyl phthalate, diisobutyl phthalate, tetrahydrofuran, dioxane, acetone, methyl isobutyl ketone, vinyl acetate, methyl methacrylate, phenyltriethoxysilane, cyclohexylmethyldimethoxysilane and dicyclopentyldimethoxysilane. The electron acceptor is a Lewis acid, preferably chosen from aluminium chloride, boron trifluoride, chloranil or alternatively alkylaluminium, haloalkylaluminium and alkylmagnesium compounds.

The catalytic components A and/or B can be a chromium (VI) oxide deposited on an inert substrate such as silica.

The catalytic components A and/or B can be any solid catalytic component combining different catalytic components.

The catalytic components A and/or B can be a prepolymer.

The prepolymerization and polymerization reactions take place in particular by virtue of the presence of transition metals contained in the catalytic components or prepolymers present during the said prepolymerization and polymerization.

According to the nature of the catalytic components and therefore of the transition metals which the latter contain, it will be appropriate to introduce cocatalysts possibly necessary for the desired prepolymerizations or polymerizations. The role of these cocatalysts is well known to those skilled in the art. Their presence in the prepolymerization and/or polymerization medium may be necessary in order to activate the transition metals resulting from the catalytic components used.

Generally, a prepolymer contains the same transition metals as the catalytic component from which the said prepolymer has resulted after prepolymerization in the presence of the said catalytic component.

Thus, if the presence of a cocatalyst was necessary to activate a transition metal contained in a catalytic component during a prepolymerization, the presence of a cocatalyst, which can be of the same nature, will also be necessary during the polymerization in the presence of this prepolymer because these are the same transition metals which it is advisable to activate in the prepolymerization and in the polymerization.

In consequence:
- during a prepolymerization A, if necessary, at least one cocatalyst capable of activating the transition metal(s) contributed by the catalytic component A is present in the prepolymerization A medium,
- during a prepolymerization AB, if necessary, at least one cocatalyst capable of activating the transition metal(s) contributed by the catalytic component A and the transition metal(s) contributed by the catalytic component B is present in the prepolymerization AB medium,
- during a polymerization, if necessary, at least one cocatalyst capable of activating the transition metal(s) contributed by the catalytic component A and the transition metal(s) contributed by the catalytic component B is present in the polymerization medium.

The presence of the cocatalyst(s) in the prepolymerization or polymerization media can be provided for by adding the cocatalyst(s) respectively to the prepolymerization or polymerization media. This addition can be carried out at the beginning of the said prepolymerization or polymerization.

The presence of the cocatalyst(s) in the prepolymerization or polymerization media can also be provided for, before prepolymerization or polymerization, by impregnation of the catalytic component or of the prepolymer in the presence of which it is desired to carry out the prepolymerization or polymerization.

Moreover, it is also possible to introduce, during the prepolymerization AB, the amount of cocatalyst subsequently necessary for the polymerization. If the operation is thus carried out, the prepolymer AB can contain a sufficient amount of cocatalyst for it to be no longer necessary to introduce cocatalyst during the polymerization.

Moreover, it is also possible to introduce, during the prepolymerization A, the amount of cocatalyst subsequently necessary for the prepolymerization AB. If the operation is thus carried out, the prepolymer A can contain a sufficient amount of cocatalyst for it to be no longer necessary to introduce cocatalyst during the prepolymerization AB.

Moreover, it is also possible to introduce, during the prepolymerization A, the amount of cocatalyst subsequently necessary for the polymerization and for the prepolymerization AB. If the operation is thus carried out, the prepolymer A can contain a sufficient amount of cocatalyst for it to be no longer necessary to introduce cocatalyst during the polymerization and during the prepolymerization AB.

If, for example, a catalytic component containing magnesium, chlorine and titanium atoms is used, use will preferably be made, as cocatalyst of the said titanium, of an organic aluminium derivative.

This organic aluminium derivative can be a derivative of formula $R^1R^2R^3Al$ in which $R^1$, $R^2$ and $R^3$, which can be identical or different, each represent either a hydrogen atom or a halogen atom or an alkyl group containing from 1 to 20 carbon atoms, at least one of $R^1$, $R^2$ or $R^3$ representing an alkyl group. Mention may be made, as an example of a suitable compound, of ethylaluminium dichloride or dibromide or dihydride, isobutylaluminium dichloride or dibromide or dihydride, diethylaluminium chloride or bromide or hydride, di-n-propylaluminium chloride or bromide or hydride, or diisobutylaluminium chloride or bromide or hydride. In preference to the abovementioned compounds, use is made of a trialkylaluminium such as tri-n-hexylaluminium, triisobutylaluminium, trimethylaluminium or triethylaluminium.

The cocatalyst can also be an aluminoxane. This aluminoxane can be linear, of formula

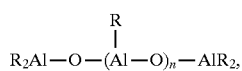

or cyclic, of formula

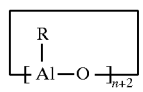

R representing an alkyl radical comprising from one to six carbon atoms and n being an integer ranging from 2 to 40, preferably from 10 to 20. The aluminoxane can contain R groups of different nature.

The amounts of cocatalyst used, whether during a prepolymerization or during the polymerization, must be sufficient to activate the transition metal(s). Generally, when an organic aluminium derivative is used as cocatalyst, an amount of it is introduced such that the atomic ratio of the aluminium contributed by the cocatalyst to the transition metal(s) which it is desired to activate ranges from 0.5 to 10,000 and preferably from 1 to 1,000.

The organic aluminium derivative used during Stage b), intended to produce the aggregate, can be chosen from the liquid derivatives of the organic aluminium derivatives which have just been mentioned as possible cocatalysts of the titanium.

If this organic aluminium derivative may be suitable as cocatalyst activating the transition metals contributed by the catalytic component A, it is possible to introduce, during Stage b), a sufficient amount of organic aluminium derivative for it no longer to be necessary to add cocatalyst necessary for activation of the transition metals contributed by the catalytic component A, during the prepolymerization AB.

Likewise, if this organic aluminium derivative may be suitable as cocatalyst activating the transition metals contributed by the catalytic component A, it is possible to introduce, during Stage b), a sufficient amount of organic aluminium derivative for it no longer to be necessary to add cocatalyst necessary for activation of the transition metals of the catalytic component A during the prepolymerization AB, nor the polymerization.

If this organic aluminium derivative may be suitable as cocatalyst activating the transition metals contributed by the catalytic component B, it is possible to introduce, during Stage b), a sufficient amount of organic aluminium derivative for it no longer to be necessary to add cocatalyst necessary for activation of the transition metals contributed by the catalytic component B, during the prepolymerization AB.

Likewise, if this organic aluminium derivative may be suitable as cocatalyst activating the transition metals contributed by the catalytic component B, it is possible to introduce, during Stage b), a sufficient amount of organic aluminium derivative for it no longer to be necessary to add cocatalyst necessary for activation of the transition metals of the catalytic component B during the prepolymerization AB, nor the polymerization.

At least one electron donor can be added to the prepolymerizations or polymerizations. This electron donor can be, for example, chosen from Lewis bases, esters and polyesters of oxygen-containing acids, ethers and polyethers, amines, silicon compounds such as silanes and alkylalkoxysilanes of formula $SiR^1R^2(OR)_2$, $SiR^1(OR)_3$ or $SiR^1R^2R^3(OR)$, R, $R^1$, $R^2$ and $R^3$, which can be identical or different, being hydrocarbon groups containing from 1 to 12 carbon atoms, and from phosphorus compounds such as phosphates and phosphonates, the preferred compounds being aromatic acid alkyl esters or polyesters, alkyl mono- or diethers, alkoxysilanes and alkylalkoxysilanes.

The aggregate of Stage b) is produced by adding, to the prepolymer A, first a liquid organic aluminium derivative and then the catalytic component B. This operation is preferably carried out with stirring. Generally, this liquid organic aluminium derivative is introduced in an amount such that the body obtained remains pulverulent and such that the molar ratio of the aluminium thus added to the transition metal contained in the prepolymer A ranges from 1 to 1000.

Polymers can be obtained by polymerization of at least one olefin in the presence of the prepolymer AB according to the invention.

The olefins which can be used, either for the prepolymerizations or for the polymerization, can be α-olefins containing from two to eight carbon atoms, such as ethylene or propylene, or their mixtures. The terms polymerization and prepolymerization which are made use of in the present application therefore cover copolymerization reactions. Preference is given, among α-olefin mixtures, to a mixture of ethylene and of at least one α-olefin containing from three to eight carbon atoms, the percentage of ethylene in the mixture generally being greater than 90% by weight.

The prepolymerization A can be carried out by prepolymerization of the abovementioned olefins by virtue of suspension or gas-phase polymerization processes.

The polymerization in the presence of prepolymer AB can be carried out by polymerization of the abovementioned olefins by virtue of suspension or gas-phase polymerization processes.

The suspension or gas-phase polymerization processes are known in their principle to those skilled in the art.

A suspension polymerization process consists in carrying out a polymerization in suspension in an inert medium and especially in an aliphatic hydrocarbon, such as n-heptane, n-hexane, isohexane or isobutane.

The operating conditions for these suspension or gas-phase polymerization processes are those which are generally proposed for similar cases requiring conventional catalytic systems of supported or non-supported Ziegler-Natta type.

For example, for a suspension polymerization process, it is possible to carry out the reaction at temperatures ranging up to 250° C. and under pressures ranging from atmospheric pressure to 250 bars.

A gas-phase polymerization process can be implemented using any reactor which makes possible a gas-phase polymerization and in particular in a stirred bed and/or fluidized bed reactor.

The conditions under which the gas-phase polymerization is carried out, especially temperature, pressure, injection of the olefin or olefins into the stirred bed and/or fluidized bed reactor, and control of the polymerization temperature and pressure are analogous to those proposed in the prior art for the gas-phase polymerization of olefins. The reaction is generally carried out at a temperature less than the melting point M.p. of the polymer or prepolymer to be synthesized and more particularly between +20° C. and (M.p. −5) ° C., and under a pressure such that the olefin or olefins are essentially in the vapour phase.

The suspension or gas-phase polymerization processes can involve a chain-transfer agent, so as to control the melt index of the prepolymer or polymer to be produced. The preferred chain-transfer agent is hydrogen, which is used in an amount which can range up to 90%, and which preferably lies between 0.1 and 60%, of the number of moles of the combined olefins and hydrogen conveyed to the reactor.

The prepolymerizations A and AB are preferably carried out at a controlled monomer flow rate, it being possible for the said flow rate to be between 0.1 and 500 g/h/millimole of transition metal contributed respectively by the catalytic component A and the catalytic component AB.

It is possible to balance the relative influence in polymerization of the catalytic component A and of the catalytic component B by varying the degree of prepolymerization A. By increasing the degree of prepolymerization A, the relative influence of the catalytic component A during the polymerization is decreased. Of course, it is also possible to balance the relative influence of the components A and B by varying the amounts of each of these components. Generally, the degree of prepolymerization A is between 0.5 and 500 grams per millimole of transition metal contributed by the catalytic component A. The degree of progression of the prepolymerization AB is preferably between 0.5 and 1000 grams per millimole of transition metal contributed by the catalytic component A and the catalytic component B.

In the following examples, the characteristics of the prepolymers and of the polymers synthesized were determined by the following techniques:

Number-average molecular mass (represented by Mn) and weight-average molecular mass (represented by Mw) of the polymers: the polymers were characterized by steric exclusion chromatography using a refractometric detection analytical system similar to that described in D. Lecacheux, Journal of Applied Polymer Science, Volume 217, 4867 (1982). The calculations were carried out from molecular masses resulting from polystyrene calibration and corrected by virtue of the laws of Mark Houwink. The polymolecularity of the polymers is obtained from the ratio of the weight-average molecular mass to the number-average molecular mass. This ratio is represented by Mw/Mn.

Distribution of the particle sizes: they are evaluated by calculating a parameter known as SPAN using the following formula:

SPAN=(D90−D10)/D50, D90, D50 and D10 representing diameters below which are found respectively 90%, 50% and 10% by mass of the particles. In the case of the prepolymer and solid catalytic component particles, D90, D50 and D10 are determined by means of a Malvern 1600 laser particle sizer. In the case of the polymer particles, D90, D50 and D10 are determined by sieving.

Melt indices: ASTM standard 1238. $MI_2$ represents the weight of polymer in grams passed in 10 minutes through a standardized die at 190° C. and under a weight of 2.1 kg.

EXAMPLES

In the following examples, the catalytic component A is prepared as for Catalyst 2 in Example 1 of the French patent application filed under number 86FR-004413. This catalytic component is substantially spherical and contains 2.2% by weight of titanium and 20.6% by weight of magnesium. Its D50 is 37 μm and its SPAN is 0.48, which reflects a narrow particle size distribution.

In the following examples, the catalytic component B is prepared by co-milling $TiCl_4$ and anhydrous $MgCl_2$. This catalytic component contains 3% of titanium and 22% of magnesium. Its D50 is 16 μm and its SPAN is 4.8, which reflects a broad particle size distribution. The morphology of this catalytic component is not controlled, that is to say it does not have an axis of symmetry.

Example 1 a) Synthesis of a prepolymer AB 0.75 liter of hexane, 0.75 ml of trihexylaluminium (THA) and 2.366 grams of catalytic component A are introduced, at 60° C. and under a nitrogen atmosphere, into a 2.5 liter reactor equipped with a jacket for regulating the temperature and with a stirrer system. The reactor is pressurized with 1 bar of nitrogen and 1.5 bar of hydrogen and it is then supplied with a regular flow of ethylene for one hour at 60° C., so as to obtain 120 grams of prepolymer A.

After having decompressed and removed the solvent by purging with nitrogen at 60° C., 4.6 ml of trihexylaluminium and then 2.948 grams of catalytic component B are added, under nitrogen and with slow stirring, to the prepolymer A. The reactor is again pressurized with 1 bar of nitrogen and then 1.5 bar of hydrogen and is then supplied with a regular flow of ethylene for 2.5 hours, so as to obtain, by prepolymerization AB, 419 grams of a prepolymer AB (i.e. 79 grams of prepolymer AB per gram of catalytic component A and B).

The prepolymer AB contains 340 ppm of titanium and 1,034 ppm of aluminium. Its D50 is 159 μm and its SPAN is 0.93, which reflects a narrow particle size distribution. The prepolymer AB is substantially spherical in shape and with a substantially homogeneous composition.

b) Polymerization in the presence of the Prepolymer AB

The prepolymer AB, the synthesis of which has just been described, is used in suspension polymerization in the following way.

The following are introduced in order, under a nitrogen atmosphere and at room temperature, into a 4 liter reactor equipped with a temperature controller and a stirrer: 1.5 liter of hexane, 2.8 ml of triisobutylaluminium (TiBA) and 2.4 grams of prepolymer AB, the synthesis of which has just been described.

The reactor is pressurized with 2 bars of nitrogen and then its temperature is raised to 80° C. 4 bars of hydrogen are then introduced and pressurization is completed by adjusting the total pressure to 13 bars with ethylene. This pressure is kept constant by addition of ethylene for 3 hours, following which injection of ethylene is stopped and the reactor is cooled to 25° C. The polymer is then deactivated by addition of an acidic methanol solution.

After drying at 80° C. under a nitrogen purge, the polymer P1 is isolated. 486 grams of polymer P1 were obtained, which corresponds to a productivity of 16,000 grams of polymer per gram of catalytic component A and B. The polymer P1 is of controlled morphology, is substantially homogeneous and does not exhibit fine particles.

The polymer P1 additionally exhibits the following characteristics:

SPAN=0.73
D50=911 μm
$MI_2$=1.4 g/10 min
Mw=115,000 g/mol
Mw/Mn=7.3

Example 2 (comparative)

a) Synthesis of a prepolymer 0.75 liter of hexane, 5 ml of trihexylaluminium, 2.48 grams of the catalytic component A and 2.92 g of the catalytic component B are introduced, at 60° C. and under a nitrogen atmosphere, into a 2.5 liter reactor equipped with a jacket for regulating the temperature and with a stirrer system. The reactor is pressurized with 1 bar of nitrogen and 1.5 bar of hydrogen and it is then supplied with a regular flow of ethylene for 3.5 hours, so as to obtain 432 grams of prepolymer, which corresponds to 80 grams of prepolymer per gram of catalytic component A and B. This prepolymer, which is called prepolymer A+B, contains 335 ppm of titanium and 915 ppm of aluminium. It exhibits the following characteristics:

D50=130 μm, SPAN=1.75

The morphology of this prepolymer is heterogeneous and is a mixture of grains, some of which, substantially spherical, arise from the catalytic component A and the others of which, without morphology, arise from the catalytic component B.

b) Synthesis of a polymer 2.4 grams of the prepolymer A+B are used in polymerization under the same conditions as for the polymerization described in b) in Example 1. 465 grams of polymer P2 are thus obtained, which corresponds to a productivity of 15,500 grams of polymer per gram of catalytic component A and B.

The polymer P2 exhibits a heterogeneous morphology.
Its other characteristics are as follows:

$MI_2$=1.5 g/10 min
Mw=113,000 grams/mol
Mw/Mn=7.1
D50=788 μm
SPAN=2.03

Example 3 (comparative)

22 mg of catalytic component A are used in polymerization under the same conditions as for the polymerization described in b) in Example 1. 227 grams of polymer P3 are thus obtained, which polymer is of substantially spherical morphology and moreover exhibits the following characteristics:

D50=724 μm
SPAN=0.25
$MI_2$=1.9 g/10 min
Mw=105,000 grams/mol
Mw/Mn=5.9

Example 4 (comparative)

34 mg of catalytic component B are used in polymerization under the same conditions as for the polymerization described in b) in Example 1. 696 grams of polymer P4 are thus obtained, which polymer is without morphology and moreover exhibits the following characteristics:

D50=815 μm
SPAN=1.54
$MI_2$=1.5 g/10 min
Mw=110,000 grams/mol
Mw/Mn=6.5

Example 5 (comparative)

A mixture composed of 12 mg of catalytic component A and of 15 mg of catalytic component B is used in polymerization under the same conditions as those of the polymerization described in Example 1.

400 grams of polyethylene P5 are thus obtained, which polyethylene is composed of a mixture of grains of substantially spherical shape and of grains without morphology. This polymer P5 exhibits in addition the following characteristics:

D50=805 μm

SPAN=2.28

$MI_2$=1.4 g/10 min

Mw=115,000 grams/mol

Mw/Mn=7

I claim:

1. Process for the preparation of a substantially homogeneous prepolymer comprising:
    a) preparation of a prepolymer A active for the polymerization of olefins by suspension or gas-phase prepolymerization of at least one olefin in the presence of a solid catalyst component A, then,
    b) addition of a liquid organic aluminum compound and then of a solid catalytic component B on the prepolymer A active for the polymerization of olefins, to obtain an aggregate, then,
    c) gas-phase prepolymerization AB of at least one olefin in the presence of the aggregate obtained in b).

2. Process according to claim 1, wherein the organic aluminum compound is a trialkylaluminum.

3. Process according to claim 1, wherein the solid catalytic component A and/or the solid catalytic component B contains a titanium compound capable of polymerizing olefins.

4. Process according to claim 1, wherein the molar ratio of the organic aluminum compound added in b) to a transition metal contained in the prepolymer A ranges from 1 to 1,000.

5. Process according to claim 1, wherein the prepolymerizations A and/or AB are carried out at a controlled monomer flow rate of at least one olefin.

6. Prepolymer obtained by the process of claim 1.

7. Process for the polymerization of at least one olefin in the presence of the prepolymer of claim 6.

8. Process for the preparation of a substantially homogeneous prepolymer consisting essentially of:
    a) preparation of a prepolymer A active for the polymerization of olefins by suspension or gas-phase prepolymerization of at least one olefin in the presence of a solid catalytic component A having a first morphology, then,
    b) addition of a liquid organic aluminum compound cocatalyst and then of a solid catalytic component B having a second morphology on the prepolymer A, to obtain an aggregate, then,
    c) gas-phase prepolymerization AB of at least one olefin in the presence of the aggregate obtained in b) whereby a substantially homogeneous prepolymer is obtained, the homogeneous prepolymer being an active polymer obtained by polymerization of the at least one olefin in the presence of the catalytic components, said active polymer representing not more than ten percent of the mass of the total polymer synthesizable by Polymerization of the at least one olefin in the presence of the homogeneous Prepolymer.

9. A homogeneous prepolymer AB consisting of a solid catalyst component A active for the polymerization of olefins and a different solid catalytic component B each of which different components contribute different properties to prepolymer AB and the prepolymer AB is more homogeneous than if a simple mixture of different solid catalytic components A and B are used in a prepolymerization, the prepolymer AB being an active polymer obtained by polymerization of at least one olefin in the presence of a catalytic component, said active Polymer representing not more than ten percent of the mass of the total polymer synthesizable by polymerization of the at least one olefin in the presence of the prepolymer AB.

* * * * *